United States Patent [19]
Schwärzler

[11] Patent Number: 5,765,837
[45] Date of Patent: Jun. 16, 1998

[54] CONVOLUTED BOOT WITH INNER ANNUAL RIBS

[75] Inventor: Peter Schwärzler, Glattbach, Germany

[73] Assignee: Lohr & Bromkamp GmbH, Offengbach/Main, Germany

[21] Appl. No.: 783,369

[22] Filed: Jan. 13, 1997

[30] Foreign Application Priority Data

Jan. 13, 1996 [DE] Germany .................. 196 01 096.9

[51] Int. Cl.⁶ .................................................. F16J 15/00
[52] U.S. Cl. .................................................. 277/636; 403/50
[58] Field of Search ................ 277/212 FB, 212 R, 277/212 C; 403/50; 464/175

[56] References Cited

U.S. PATENT DOCUMENTS

| | | | |
|---|---|---|---|
| 4,559,025 | 12/1985 | Dore | 277/212 FB |
| 4,678,064 | 7/1987 | Adachi et al. | 277/212 FB |
| 4,702,483 | 10/1987 | Ukai et al. | 464/175 |
| 4,877,258 | 10/1989 | Alt et al. | 277/212 FB |
| 4,878,389 | 11/1989 | Boge | 277/212 FB |
| 4,923,432 | 5/1990 | Porter | 277/212 FB |
| 4,927,678 | 5/1990 | Lallement | 464/175 |
| 5,251,916 | 10/1993 | Martin et al. | 277/212 FB |
| 5,311,912 | 5/1994 | Hayward | 277/212 FB |

FOREIGN PATENT DOCUMENTS

| | | |
|---|---|---|
| 0319381 | 8/1992 | European Pat. Off. . |
| 2605458 | 8/1977 | Germany . |

*Primary Examiner*—Daniel G. DePumpo
*Attorney, Agent, or Firm*—Howard & Howard

[57] ABSTRACT

A convoluted boot (11) seals an annular gap between two parts which are non-rotatably connected to one another and articulatable relative to each other. The invention is especially useful at a constant velocity universal joint. The boot has a plurality of fold units (20) which each consist of two annular flanks (21, 22) connected to one another by an outer annular fold (23). Two fold units (20) are connected to one another by an inner annular fold (24). The boot has a first collar (14) to be fixed to one of the parts, and a second collar (15) to be fixed to the second one of the parts. The collar adjoin the longitudinally outer fold units (20). Annular ribs (27) are formed on the annular flanks (21, 22) at a distance from the outer annular folds (23) and the inner annular folds (24).

7 Claims, 2 Drawing Sheets

CONVOLUTED BOOT WITH INNER ANNUAL RIBS

TECHNICAL FIELD

This invention relates to a convoluted boot for sealing an annular gap between two rotatably fixed parts in constant velocity universal joints.

BACKGROUND OF THE INVENTION

The invention relates to a convoluted boot for sealing an annular gap between two parts which are rotatably fixed to one another and articulatable relative to each other, and especially in a constant velocity universal joint. This type of boot has a plurality of fold units which each consist of two annular flanks which are connected to one another by an outer annular fold. Two fold units are connected to one another by an inner annular fold. A first collar is fixed to one of the parts, and a second collar is fixed to the second one of the parts. The collars adjoin the longitudinally outer fold units. This known boot often has at least one reinforcing annular rib on the inside of one of the fold units. The annular flanks may be conical, concavely or convexly curved, or a combination of such shapes. When the non-rotatably connected parts are in an articulated position, it is possible that a convoluted boot may rotate with the parts at a high speed. The boots are then subjected to centrifugal forces which may cause them to move radially away from the axial lines of the parts rotationally fixed to one another. This means that the convoluted boots are subject to a high degree of fulling (squeezing), which may lead to an early and rapid destruction of the boot.

To counteract the above-mentioned radial outward movement, reinforcing ribs have already been provided on the insides of the convoluted boots at the inside of the inner annular folds between two fold units. The resulting increase in stiffness with convoluted boots of this type counteracts any radial outward movement at high speeds, especially when the boot is in the articulated position. However, the increase in stiffness caused by the annular ribs in the fold valleys where most of the deformation takes place, at the same time increases the degree of fulling, so that under conditions of articulation, the resulting deformation of the convoluted boot accelerates the aging process and causes the formation of cracks, especially in the fold valley with the largest diameter.

EP 0 319 381 B1 proposes a convoluted boot which comprises a conical part and a cylindrical part provided with a plurality of arched folds. The conical part is followed by a first collar to be fixed to the outer joint part, and the cylindrical part is followed by a second collar for being fixed to a connecting shaft. Between the first collar and the conical part, the inside of the convoluted boot is provided with a radial annular rib which rests against the outer joint part. The purpose of this rib is to protect the conical part from being damaged by the outer joint part and also serves to increase stiffness in the part. Furthermore, on the inside of the conical part itself there are shown individual circular protective projections whose purpose it is to protect that part of the boot from damage caused by radially inner edge portions of the outer part of a tripod joint. The description of this embodiment contains mistakes.

U.S. Pat. No. 4,702,483 describes a convoluted boot of the standard basic shape wherein the inside of fold valleys is provided with laterally arranged annular beads which, when the convoluted boot is highly articulated, contact one another in pairs and to act as wear strips.

DE 26 05 458 A1 proposes a rolling boot which, substantially, consists of two wall arches which are radially positioned inside one another and which are curved in opposite directions. In the region where the curvature changes, there is provided a continuous annular bead to increase stiffness.

SUMMARY OF THE INVENTION AND ADVANTAGES

It is the object of the invention to improve a convoluted boot of the initially mentioned type in that, while featuring an increase in stability, the required flexibility is not adversely affected.

The objective is achieved in that an annular rib is formed on at least one of the annular flanks at a distance from the outer annular fold, i.e. fold peak, and from the inner annular fold, i.e. fold valley. In this way, it is advantageously possible to avoid an accumulation of material and an increase in stiffness in those regions where the greatest relative movements occur, i.e. in the fold valleys where now a high degree of deformation can be accommodated without undesirable stresses in the material. As far as the number of annular ribs in accordance with the invention is concerned, there should be at least one such annular rib which, with the usual decrease in size of the individual fold units, should be provided at the greatest complete fold unit. As a rule, a larger number of annular ribs will be provided, however there exists the option of eliminating the annular ribs at the fold units with smaller diameters.

If the fold units comprise annular flanks with different opening angles relative to the longitudinal axis, it is proposed to provide the annular ribs at the respective flanks with smaller opening angles relative to the longitudinal axis. In this way it is easier to achieve a larger opening angle of the annular rib itself relative to the longitudinal axis, and with reference to this embodiment it is proposed that at least one annular rib itself comprises a conical shape which is especially advantageous from the point of view of increasing the stiffness.

The thickness of the annular rib preferably corresponds to the thickness of the respective annular flank, with the height of the annular rib preferably being greater than the maximum thickness of same.

Inventive annular ribs at the fold units with the greater diameter may be combined with conventional annular ribs in the fold valleys of the fold units with smaller diameters in a boot.

BRIEF DESCRIPTION OF THE DRAWINGS

A preferred embodiment of the invention will be described below with reference to the drawings and compared with a convoluted boot according to the state of the art. Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
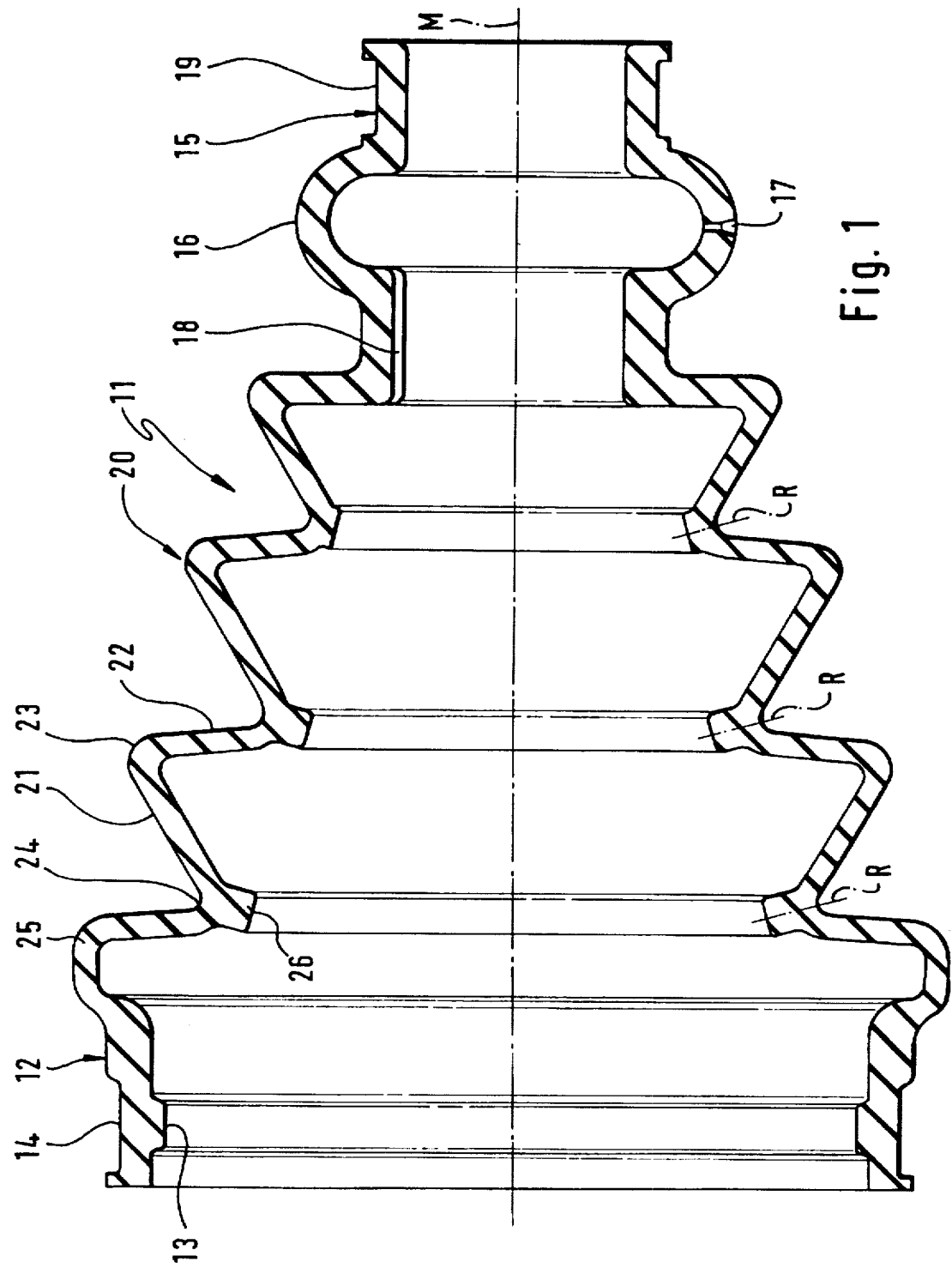
FIG. 1 is a longitudinal section of a convoluted boot of the above-mentioned species according to the state of the art.

FIG. 1 shows a convoluted boot 11 which is substantially rotationally symmetric relative to a central axis M. A first larger collar region 12 with an inner annular bead 13 and an outer annular groove 14 is provided especially for being fixed to an outer joint part. The annular bead 13 engages a corresponding annular bead at the outer joint part and the outer annular groove 14 serves to accommodate a tensioning strip.

A second collar, generally indicated at 15, with a smaller diameter comprises a wall arch 16 provided with a ventilation hole 17. Furthermore, there is provided a longitudinal groove 18 which serves as a pressure equalizing connection between the inside of the convoluted boot 11 and the ventilation hole 17. The collar 15, too, comprises an outer annular groove 19 which serves to fix a tensioning strip. The collar 15 is provided to be fixed to a connecting shaft. Between the larger collar 12 and the smaller collar 15, there is provided a plurality of fold units 20 consisting of two conical annular flanks 21, 22 and an outer annular fold 23. The individual fold units 20 are connected to one another by inner annular folds 24. The fold unit 20 with the greatest diameter adjoins the larger collar 14 by means of a wall arch 25.

On the inside of the convoluted boot 11, the inner annular folds 24 are each provided with reinforcing annular ribs 26 whose central planes R are slightly conical in shape. To reduce a radial outward movement of the convoluted boot 11 it is hereby possible to achieve an increase in stiffness in a positive sense, but the bending movements in the inner annular folds 24 during articulation of the two collar regions against one another are restricted due to the accumulation of material in the inner annular folds 24.

Figure 2:
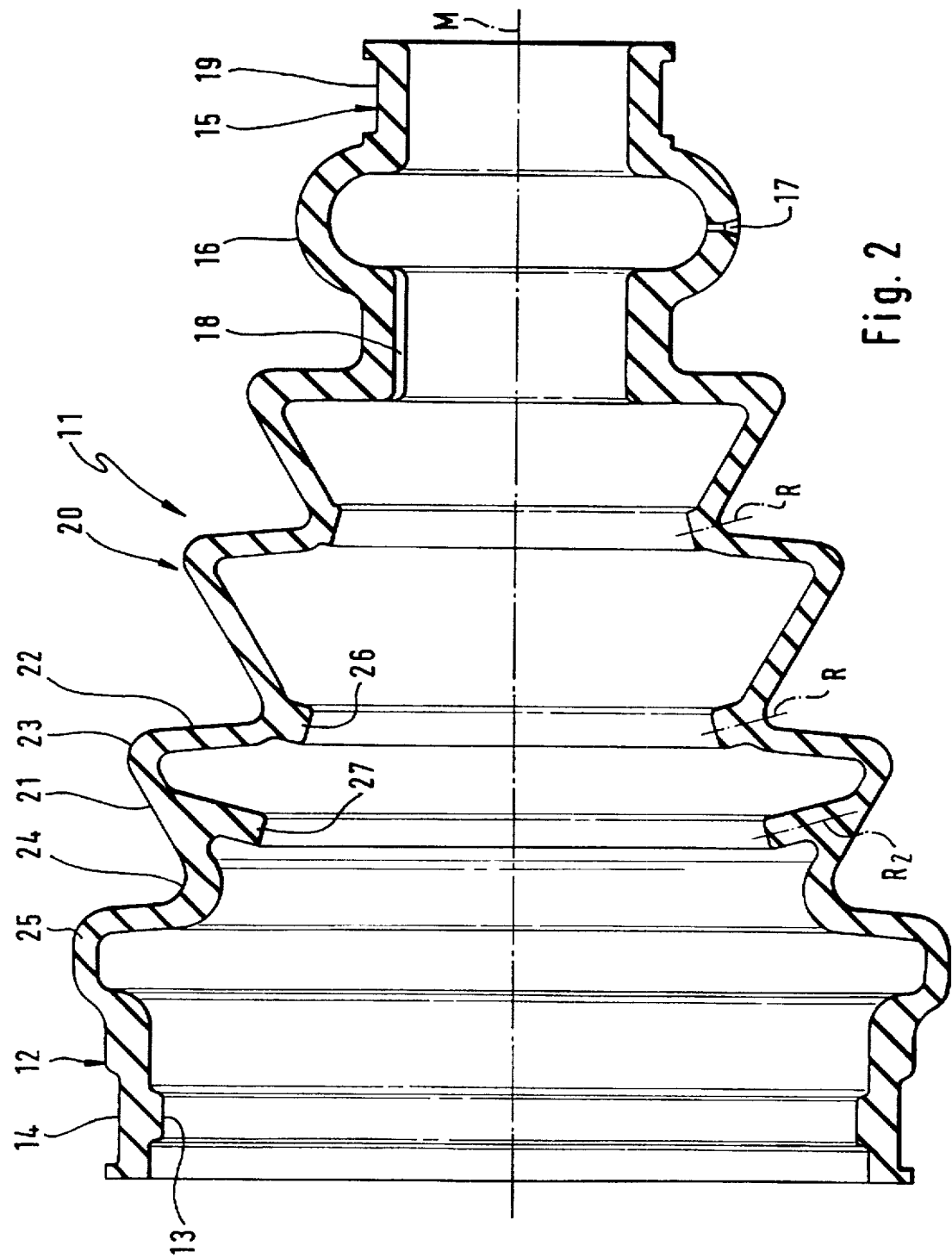
FIG. 2 is a longitudinal section of a convoluted boot according to the invention.

FIG. 2 shows a convoluted boot 11 which is substantially rotationally symmetric relative to the central axis M. A first larger collar region 12 with an inner annular bead 13 and an outer annular groove 14 is provided especially for being fixed to an outer joint part. The annular bead 13 engages a corresponding annular groove in the outer joint part and the outer annular groove 14 serves to receive a tensioning strip.

A second collar 15 with a smaller diameter comprises a wall arch 16 provided with a ventilation hole 17. Furthermore, there is provided a longitudinal groove 18 which serves as a pressure equalizing connection between the inside of the convoluted boot 11 and the ventilation hole 17. The collar 15 comprises an outer annular groove 19 which serves to fix a tensioning strip. The collar 15 is provided for being fixed to a connecting shaft. Between the larger collar 12 and the smaller collar 15, there is provided a plurality of fold units 20 consisting of two conical annular flanks 21, 22 and an outer annular fold 23. The individual fold units 20 are connected to one another by inner annular folds 24. The fold unit 20 with the greatest diameter adjoins the larger collar 14 by a wall arch 25.

In the embodiment of the invention shown here, the wall of the convoluted boot 11, at the inner annular fold 24, or fold valley, is provided with a uniform wall thickness. However, on the adjoining annular flank 21 with the smaller opening angle relative to the axis M, there is provided, on the inside, an inventive annular rib 27 whose central plane $R_2$ is slightly conical. The thickness of the annular rib 27—as projecting from rounded transitions towards the annular flank 21—approximately corresponds to the thickness of the annular flank 21. The height of the annular rib 27 approximately corresponds to its thickness—again as projecting from rounded transitions.

The inner annular folds 24 with a smaller diameter are directly provided with inner annular ribs 26 as known from the state of the art. Because ribs 26 are subjected to only slight articulation movements, undesirable stress conditions are not to be expected.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced other than as specifically described.

What is claimed is:

1. A convoluted boot (11) for sealing an annular gap between two parts which are rotatably fixed to one another and articulatable relative to each other comprising:

a plurality of fold units (20) which each consist of two annular flanks (21, 22) connected to one another by an outer annular fold (23), two adjacent fold units (20) being connected to one another by an inner annular fold (24), and having a first collar (14) to be fixed to one of the parts, and a second collar (15) to be fixed to the second one of the parts, said collars adjoining the longitudinally outer fold units (20), and having at least one reinforcing annular rib (27) on the inside of one of said fold units (20), wherein said annular rib (27) formed on at least one of said annular flanks, (21,22), and is spaced from said outer annular fold (23) and said inner annular fold (24); and the height of said annular rib (27) being greater than its thickness.

2. A convoluted boot (11) as set forth in claim 1, wherein the number of annular ribs (27) is greater than one.

3. A convoluted boot (11) as set forth in claim 1, wherein said fold units (20) are of different diameters, at least a fold unit (20) with the greatest diameter, and having two complete annular flanks (21, 22) being provided with said annular rib (27).

4. A convoluted boot (11) as set forth in claim 1, wherein said annular rib (27) is provided with a conically extending central plane $R_2$.

5. A convoluted boot (11) as set forth in claim 1, wherein the thickness of said annular rib (27) approximately corresponds to the thickness of said annular flanks (21, 22).

6. A convoluted boot (11) as set forth in claim 1, wherein said annular flank (21,22) of at least one of said fold units (20) having different opening angles with reference to said longitudinal axis, and one of said annular flanks (21) having a smaller opening angle with reference to said longitudinal axis, said one annular flank being provided with said annular rib (27).

7. A convoluted boot (11) for sealing an annular gap between parts being rotatably fixed to one another and articulatable in relation to each other and comprising:

a plurality of fold units (20) having a pair of adjacent annular flanks (21,22);

an outer annular fold (23) connecting said adjacent annular flanks (21,22) of each fold unit (20);

an inner annular fold (24) connecting adjacent fold units (20);

a reinforcing annular rib (27) disposed about the inside of one of said flanks (21,22) and spaced a distance from said inner fold (24) and said outer fold (23) associated with said flanks (21,22); and the height of said annular rib (27) being greater than its thickness.

* * * * *